(12) United States Patent
Short

(10) Patent No.: US 8,870,500 B2
(45) Date of Patent: Oct. 28, 2014

(54) ULTRASONIC MACHINING MODULE

(75) Inventor: Matthew A. Short, Grove City, OH (US)

(73) Assignee: Edison Welding Institute, Columbus, OH (US)

( * ) Notice: Subject to any disclaimer, the term of this patent is extended or adjusted under 35 U.S.C. 154(b) by 643 days.

(21) Appl. No.: 13/046,099

(22) Filed: Mar. 11, 2011

(65) Prior Publication Data

US 2011/0222975 A1 Sep. 15, 2011

Related U.S. Application Data

(60) Provisional application No. 61/312,738, filed on Mar. 11, 2010.

(51) Int. Cl.
| | | |
|---|---|---|
| *B23B 37/00* | (2006.01) | |
| *B23Q 1/00* | (2006.01) | |
| *B23B 29/12* | (2006.01) | |
| *B23B 31/02* | (2006.01) | |

(52) U.S. Cl.
CPC .............. *B23B 37/00* (2013.01); *B23Q 1/0009* (2013.01); *B23B 2260/108* (2013.01); *B23B 2240/28* (2013.01); *B23B 29/125* (2013.01); *B23B 2250/16* (2013.01); *B23B 31/02* (2013.01); *B23B 2270/10* (2013.01); *B23B 2270/56* (2013.01); *Y10S 408/70* (2013.01)
USPC ................. 408/17; 408/57; 408/700

(58) Field of Classification Search
USPC .............. 408/57, 700, 17; 409/136, 135, 232, 409/234; 279/102, 103; 310/323.18, 346, 310/323.12, 328
See application file for complete search history.

(56) References Cited

U.S. PATENT DOCUMENTS

| | | | | |
|---|---|---|---|---|
| 2,342,610 A | * | 2/1944 | Elliott | 451/358 |
| 3,561,462 A | * | 2/1971 | Jugler | 173/199 |
| 3,614,484 A | * | 10/1971 | Shoh | 310/325 |
| 4,425,115 A | | 1/1984 | Wuchinich | |
| 4,582,239 A | | 4/1986 | Scotto | |
| 5,140,773 A | | 8/1992 | Miwa et al. | |
| 5,171,387 A | | 12/1992 | Wuchinich | |
| 5,527,273 A | | 6/1996 | Manna et al. | |

(Continued)

FOREIGN PATENT DOCUMENTS

| | | | |
|---|---|---|---|
| JP | 2088156 A | 3/1990 | |
| JP | 5208349 A | 8/1993 | |

(Continued)

OTHER PUBLICATIONS

International Search Report and Written Opinion received in PCT/US2011/028149.

*Primary Examiner* — Daniel Howell
*Assistant Examiner* — Chwen-Wei Su
(74) *Attorney, Agent, or Firm* — McNees, Wallace & Nurick, LLC

(57) ABSTRACT

A device for use in a machining system, including an ultrasonic transducer, wherein the ultrasonic transducer is adapted to receive a tool bit; a housing adapted to be both compatible with the machining system and to receive the ultrasonic transducer, wherein the housing is operative to isolate all radial and other vibrations generated by the ultrasonic transducer except the axial vibrations transmitted to the tool bit; and a tool holder, wherein the tool holder and the top portion of the housing are mechanically coupled to one another.

14 Claims, 4 Drawing Sheets

(56) References Cited

U.S. PATENT DOCUMENTS

| | | | |
|---|---|---|---|
| 5,733,074 A | 3/1998 | Stock | |
| 6,171,415 B1 | 1/2001 | Statnikov | |
| 6,204,592 B1 | 3/2001 | Hur | |
| 6,278,218 B1 | 8/2001 | Madan et al. | |
| 6,289,736 B1 | 9/2001 | Statnikov | |
| 6,338,765 B1 | 1/2002 | Statnikov | |
| 6,458,225 B1 | 10/2002 | Statnikov | |
| 6,726,223 B2 * | 4/2004 | Haimer | 279/103 |
| 6,762,535 B2 | 7/2004 | Take et al. | |
| 6,924,585 B2 | 8/2005 | Goodson | |
| 6,932,876 B1 | 8/2005 | Statnikov | |
| 7,125,208 B2 | 10/2006 | Schweizer et al. | |
| 7,137,185 B2 * | 11/2006 | Voss et al. | 29/447 |
| 7,175,506 B2 | 2/2007 | Fiebelkorn et al. | |
| 7,297,238 B2 | 11/2007 | Nayar et al. | |
| 7,431,779 B2 | 10/2008 | Statnikov | |
| 7,438,210 B2 | 10/2008 | Gale et al. | |
| 2001/0020808 A1 * | 9/2001 | Suzuki et al. | 310/323.12 |
| 2008/0041604 A1 * | 2/2008 | Sauer | 173/217 |
| 2009/0035087 A1 | 2/2009 | Nakamoto et al. | |
| 2011/0155407 A1 | 6/2011 | Yang et al. | |

FOREIGN PATENT DOCUMENTS

| | | | |
|---|---|---|---|
| JP | 63306862 A | | 12/1998 |
| JP | 2002219606 A | * | 8/2002 |
| JP | 2005224865 A | | 8/2005 |
| JP | 2006142469 A | * | 6/2006 |
| SU | 645778 A | * | 2/1979 |

* cited by examiner

ULTRASONIC MACHINING MODULE

CROSS-REFERENCE TO RELATED APPLICATIONS

This patent application claims the benefit of U.S. Provisional Patent Application Ser. No. 61/312,738 filed on Mar. 11, 2010 and entitled "Accessory Module for Applying Ultrasonic Energy to Machining Tools," the disclosure of which is hereby incorporated by reference herein in its entirety and made part of the present U.S. utility patent application for all purposes.

BACKGROUND OF THE INVENTION

The described invention related generally to systems for machining materials and more specifically to a system for machining materials into which an ultrasonic machining module has been incorporated, wherein the ultrasonic machining module is compatible with a variety of machining processes.

Machining, which is a collective term for drilling, milling, reaming, tapping, and turning, is an enabling technology that impacts virtually all aspects of manufacturing in the United States and elsewhere. With regard to a specific example, a milling machine is a machining tool used to machine solid materials. Milling machines are typically classified as either horizontal or vertical, which refers to the orientation of the main spindle. Both types range in size from small, bench-mounted devices to much larger machines suitable for industrial purposes. Unlike a drill press, which holds the workpiece stationary as the drill moves axially to penetrate the material, milling machines move the workpiece axially and radially against the rotating milling cutter, which cuts on its sides as well as its tip. Milling machines are used to perform a vast number of operations, from simple tasks (e.g., slot and key-way cutting, planing, drilling) to complex tasks (e.g., contouring, diesinking).

The accessories and cutting tools used on machine tools (including milling machines) are referred to in aggregate as "tooling". Milling machines often use CAT or HSK tooling. CAT tooling, sometimes called V-Flange Tooling, is the oldest and probably most common type used in the United States. CAT tooling was invented by Caterpillar Inc. of Peoria, Ill., to standardize the tooling used on Caterpillar machinery. HSK tooling, sometimes called "Hollow Shank Tooling", is much more common in Europe where it was invented than it is in the United States. The holding mechanism for HSK tooling is placed within the hollow body of the tool and, as spindle speed increases, it expands, gripping the tool more tightly with increasing spindle speed.

Improving the machinability of certain materials is of significant interest to manufacturers of military equipment and commercial hardware, as well as to machine tool builders. More specifically, very advanced materials such as armor plates and composites are notoriously difficult to machine with standard methods. High-speed systems and ultra-hard tool bits are used for materials such as these, but provide only a marginal increase in tool life and productivity. Significant improvements in the machinability of materials have been achieved by implementing advanced technologies such as laser, waterjet, and EDM cutting. However, these processes are high in capital cost, limited in application, and differ too much to be used in standard machine shops. Also, their application is limited to certain types of cuts in materials.

Ultrasonic-assisted machining was developed in the United States in the 1950's and was used for machining materials that were considered to be difficult to machine at the time. The more modern process of ultrasonic machining (UM) involves the application of high power ultrasonic vibrations to "traditional" machining processes (e.g., drilling, turning, milling) for improving overall performance in terms of faster drilling, effective drilling of hard materials, increased tool life, and increased accuracy. This is typically accomplished by using high speed steel (HSS) drill bits affixed to a shrink fit collet that is bolted to an ultrasonic (US) transmission line. In this context, UM is not the existing ultrasonic-based slurry drilling process (i.e., impact machining) used for cutting extremely hard materials such as glass, ceramics, quartz. Rather, this type of UM concerns methods for applying high power ultrasonics to drills, mills, reamers, taps, turning tools, and other tools that are used with modern machining systems.

Although the use of ultrasonics with modern machining systems provides significant and numerous benefits, there are certain technical challenges involved, not the least of which is the incorporation of ultrasonic energy into machining systems that were not originally designed to accommodate this type of energy output. Thus, there is an ongoing need for an ultrasonic machining module that is compatible with and that may be incorporated into existing machining systems.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a device for use in a machining system is provided. This device includes a magnetostrictive or piezoelectric ultrasonic transducer, wherein the ultrasonic transducer is adapted to receive a tool bit; and a housing adapted to be both compatible with the machining system and to receive the ultrasonic transducer, wherein the housing is operative to isolate all vibrations generated by the ultrasonic transducer except the axial vibrations transmitted to the tool bit.

In accordance with another aspect of the present invention, another device for use in a machining system is provided. This device includes an ultrasonic transducer, wherein the ultrasonic transducer is adapted to receive a tool bit; a housing adapted to be both compatible with the machining system and to receive the ultrasonic transducer, wherein the housing is operative to isolate vibrations generated by the ultrasonic transducer while at the same time still transmitting axial vibrations to the tool bit; and a tool holder, wherein the tool holder and the top portion of the housing are mechanically coupled to one another.

In yet another aspect of this invention, still another device for use in a machining system is provided. This device includes an ultrasonic transducer; a housing adapted to be both compatible with the machining system and to receive the ultrasonic transducer, wherein the housing is operative to isolate all vibrations generated by the ultrasonic transducer except the axial vibrations transmitted to the tool bit; and a tool holder, wherein the tool holder and top portion of the housing are mechanically coupled to one another, and wherein the tool holder is compatible with either CAT or HSK machining systems. The ultrasonic transducer further includes: a shrink-fit collet or other type of connector adapted to receive a tool bit; a plurality of air inlets formed in the front mass thereof; and a plurality of cooling vanes formed circumferentially around the front mass thereof beneath the air inlets, wherein the cooling vanes are operative to force air through the air inlets when the device is in operation. The housing further includes a plurality of air outlets formed therein, wherein air forced through the air inlets by the cooling vanes enters the housing, passes over the ultrasonic transducer and exits the housing through the air outlets; and a spring-like feature formed radially therein, wherein the spring-like feature is operative to isolate vibrations generated by the ultrasonic transducer when the device is in operation.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
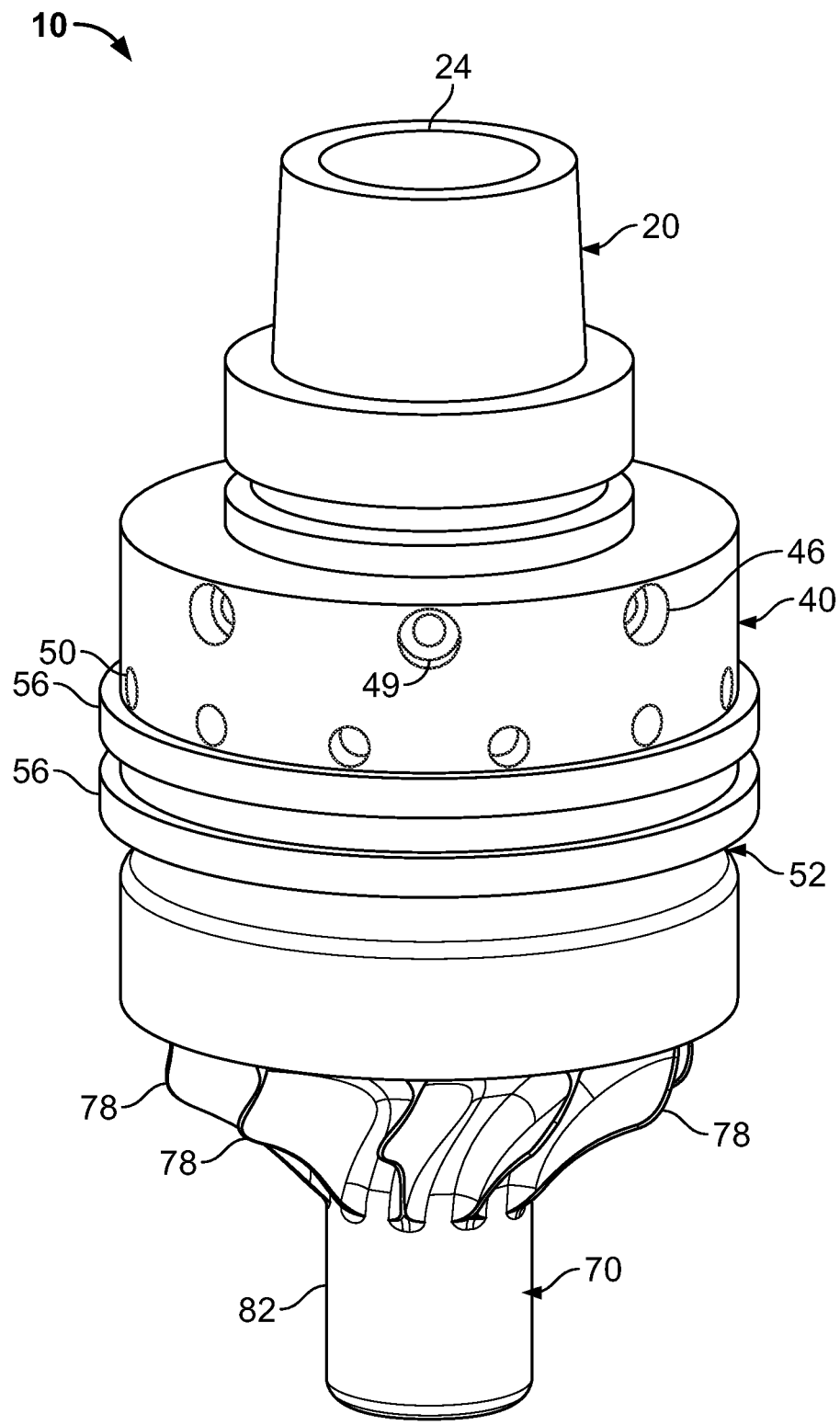
FIG. 1 is perspective view of an ultrasonic machining module in accordance with an exemplary embodiment of the present invention.
Figure 2:
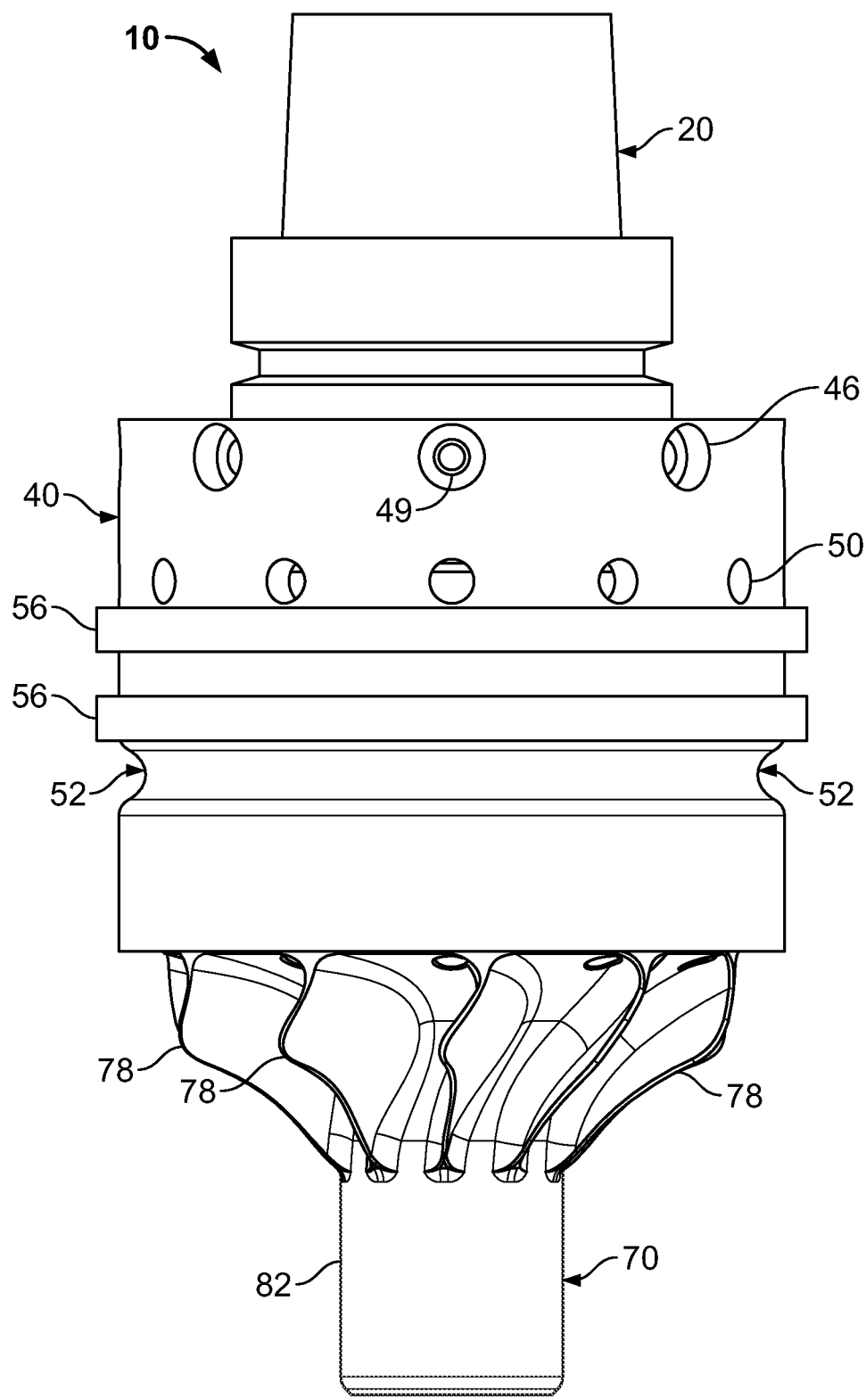
FIG. 2 is an elevated view of the ultrasonic machining module of FIG. 1.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention provides a detachable and/or replaceable machining module capable of applying ultrasonic energy to machining tools while operating within existing machining systems such as, for example, a Haas Machining Center. This machining module can be adapted to fit existing machinery and, in exemplary embodiments, utilizes a standard CAT/HSK-mount system that houses an ultrasonic transducer and provides the necessary means for attaching common machining tools. With reference now FIGS. 1-4, one or more specific embodiments of this invention shall be described in greater detail.

Figure 3:
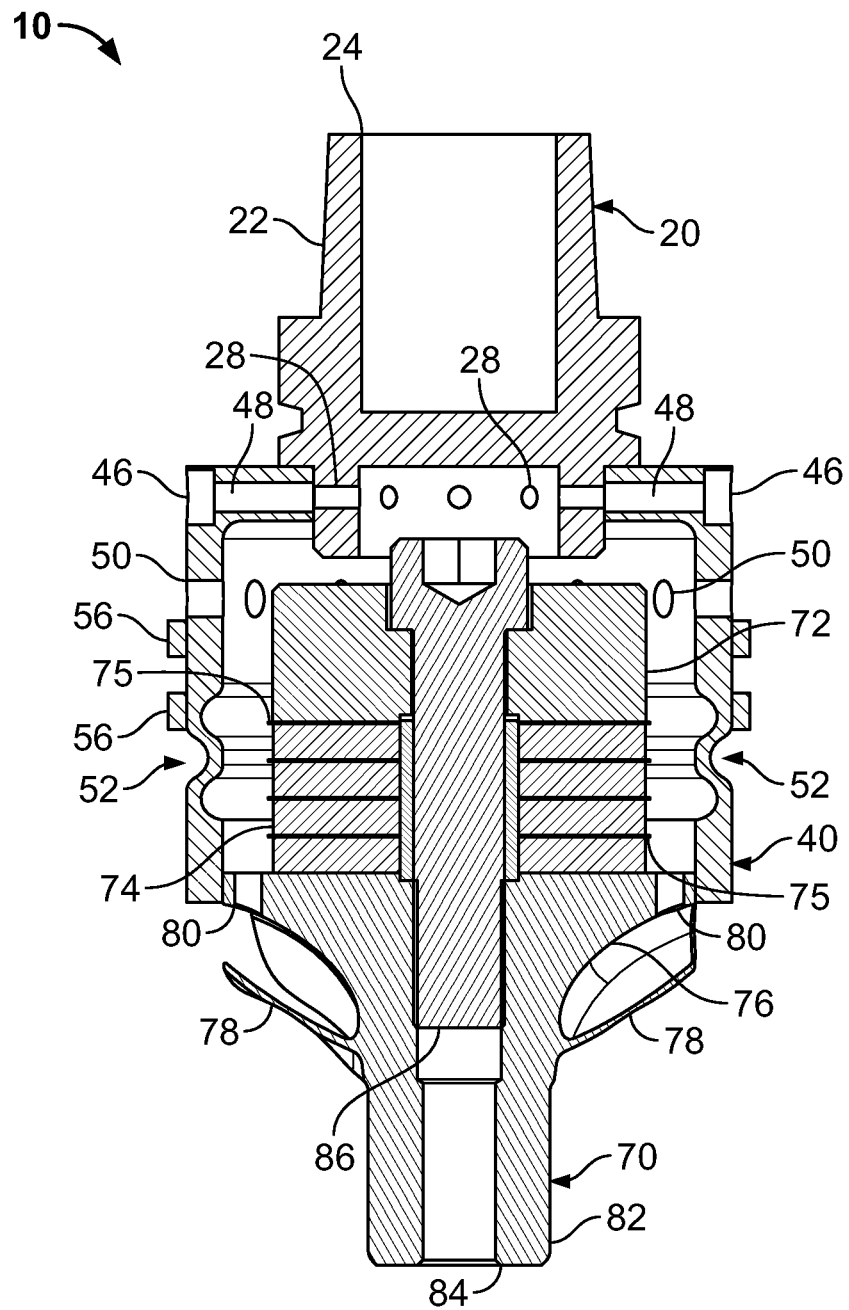
FIG. 3 is a cross-sectional view of the ultrasonic machining module of FIG. 1.
Figure 4:
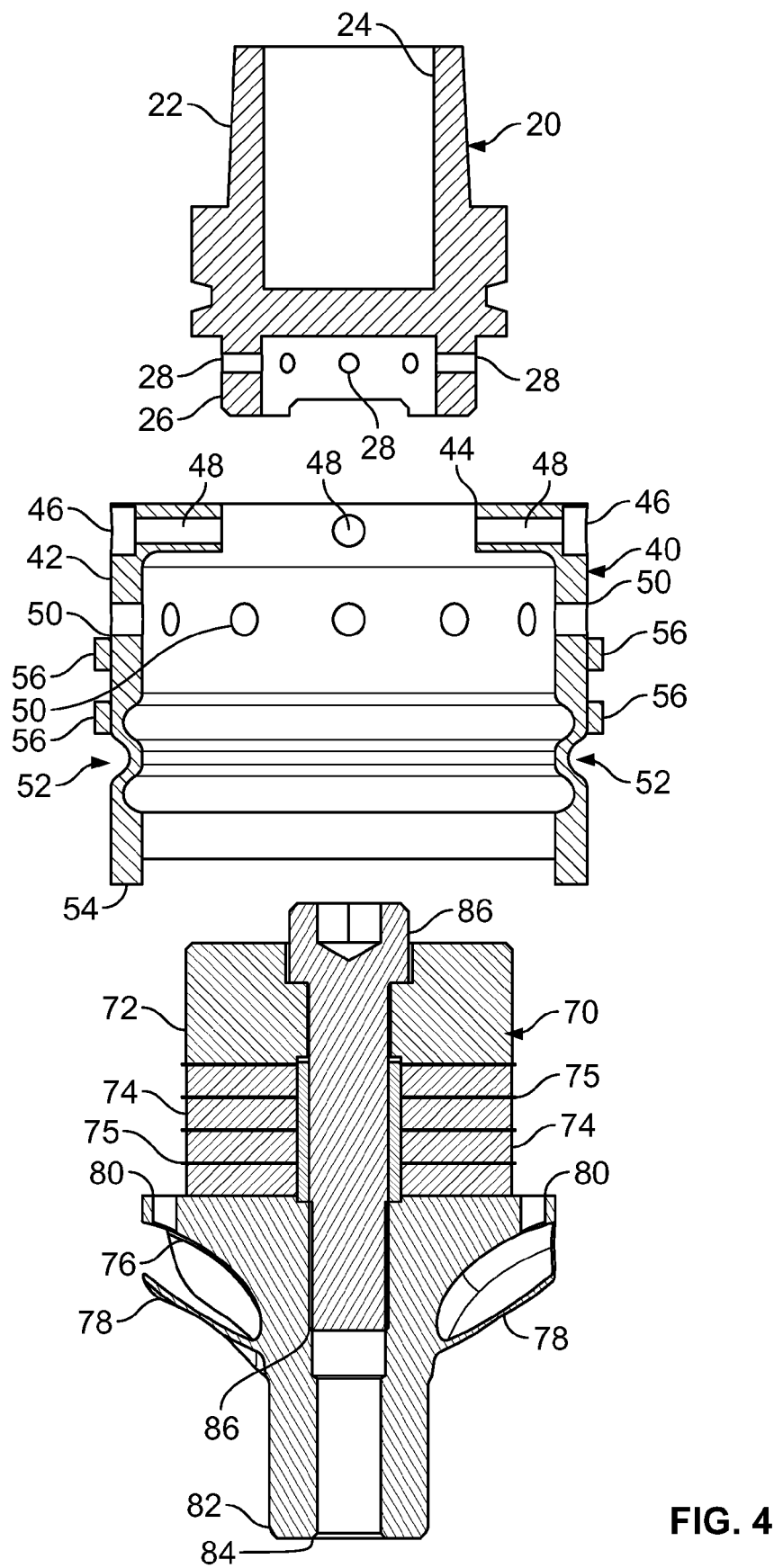
FIG. 4. is a cross-sectional exploded view of the ultrasonic machining module of FIG. 1.

As best shown in FIGS. 3-4, an exemplary embodiment of machining module 10 includes three basic components: tool holder 20, housing 40, and ultrasonic transducer assembly 70. Tool holder 20 includes upper portion 22, which further includes primary bore 24 formed therein for attaching machining module 10 to the main spindle (e.g., CAT 40, 60 or HSK) of a machining system (not shown). Lower portion 26 of tool holder 20 includes a plurality of secondary bores 28 that cooperate with similar structures in housing 40 to mechanically couple tool holder 20 to housing 40 using connectors 49 (i.e., centering bolts). In some embodiments of the present invention, tool holder 20 is shrink-fit to housing 20 in addition to or instead of being bolted thereto.

Again, as best shown in FIGS. 3-4, housing 40 includes a rigid cylindrical body 42 that further includes a centrally located aperture 44 that is adapted to receive tool holder 20, and a bottom opening 54, into which ultrasonic transducer assembly 70 is inserted. As best shown in FIG. 1, circumferential electrical contacts 56 (i.e., slip rings) are positioned on the exterior of housing 40. As will be appreciated by the skilled artisan, the use of other types of electrical contacts is possible with this invention. For example, a single contact 56 may be utilized or the contacts may extend through the spindle of the machining system, while still providing or maintaining the flow of cooling air through the spindle. The top or upper portion of housing 40 includes a plurality of apertures 46 that connect to a plurality of bores 48 that correspond to the placement of bores 28 in tool holder 20 when machining module 10 is assembled. A series of connectors 49 (see FIG. 2) are inserted into bores 48 and 28 for the purpose of bolting tool holder 20 to housing 40. As best shown by FIG. 4, a plurality of air outlets 50 is formed in housing 20. As described in greater detail below, air outlets 50 cooperate with specific structures on ultrasonic transducer assembly 70 to cool machining module 10 when in use, thereby reducing or eliminating the need for any separate or external system or apparatus for cooling piezoelectric ceramics 74.

As best illustrated by FIG. 4, housing 40 also includes circumferential region 52, which acts as a vibration isolating spring, and as such is characterized as a "spring-like structure". In the exemplary embodiment, region 52 includes a contoured and thinned section of the material from which housing 40 is manufactured. When machining module 10 is in use, region 52 permits a degree of flexion in housing 40, thereby absorbing and/or isolating acoustic energy generated by ultrasonic transducer assembly 70 and preventing unwanted vibration from traveling backward or upward into the spindle or other mechanical components of the machining system. Axial vibration generated by ultrasonic transducer assembly 70 is not diminished by region 52; therefore, torque is still delivered to the tool bit or other item that is attached to front mass 76 and that is being used to machine a workpiece. Within the context of this invention, the term "tool bit" should be understood to mean drill bit or any other any item that is attached to front mass 76. Essentially, region 52 is operative to absorb and/or isolate most or all vibrational modes except the axial vibrations directed toward the workpiece.

Again, as best illustrated by FIG. 4, ultrasonic transducer assembly 70 includes back mass 72, front mass 76, and a plurality of piezoelectric ceramics 74 positioned between these two structures. A plurality of electrodes 75 are sandwiched between piezoelectric ceramics 74, and bolt 86 passes through back mass 72, ceramics 74, electrodes 75 and a portion of front mass 76. When tightened, bolt 86 is operative to apply compressive force to piezoelectric ceramics 74. Although not shown in the Figures, a series of electrical lead wires are typically attached to at least one of the electrodes 75. These wires exit the interior of housing 40 either through housing 40 or though tool holder 20 where they then connect to circumferential electrical contacts 56. Brush contacts or other types of electrical contacts may be used to provide electricity to machining module 10. Transducer assembly 70 typically operates at power levels ranging from 1 kW-5 kW and amplitudes ranging from 25 μm-150 μm.

In the exemplary embodiment of machining module 10 shown in the Figures, ultrasonic transducer assembly 70 further includes a plurality of cooling members, fins or vanes 78 that are located circumferentially around front mass 76 just beneath a plurality of air inlets 80 that are also formed in front mass 76. When machining module 10 rotates, vanes 78, which simulate a compressor wheel, are operative to draw air upward and through air inlets 80. Air then flows through the interior of housing 40 across ceramics 74 for cooling purposes, and exits housing 40 though air outlets 50. As shown in the Figures, the front or bottom area of front mass 76 includes a tapered collet 82 that further includes bore 84, which is adapted to receive a drill bit, milling tool, or other item. As will be appreciated by the skilled artisan, a drill bit or other item (not shown) may be attached to collet 82 using the process known as shrink-fitting. By heating the mass around bore 84 uniformly, it is possible to significantly expand the diameter of the bore. The shaft of a drill bit or other item is then inserted into the expanded bore. Upon cooling the mass around the bore shrinks back to its original diameter and frictional forces create a highly effective joint. In an exemplary embodiment, the bottom edge of housing 40 is attached to the top portion of front mass 76 using a shrink-fit process for facilitating removal of case 40 for repairing ultrasonic machining module 10. As will be appreciated by the skilled artisan, other means of attaching tooling items to front mass 76 and/or attaching housing 40 to transducer assembly 70 are possible and are compatible with the present invention.

In an exemplary embodiment, some or all of the metal components of ultrasonic machining module 10 are manufactured from A2 tool steel. Alternately, D2, SS, 4140, and/or 350-M tool steel may be used. Regardless of the material used, front mass 76 and back mass 72 may both be manufactured from the same material as a means for reducing amplitude. In general terms, mixing of the mass of these components adjusts amplitude. In the exemplary embodiment shown in the Figures, total module length is about 7.5 inches (19.1 cm). However, the present invention is scalable and miniaturized variants of ultrasonic machining module 10 are compatible with medical and surgical systems and devices, among other applications.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A device for use in a machining system, comprising:
   (a) an ultrasonic transducer, wherein the ultrasonic transducer is adapted to receive a tool bit, and wherein the ultrasonic transducer further comprises:
      (i) a front mass;
      (ii) a back mass;
      (iii) a plurality of piezoelectric ceramics positioned between the front mass and back mass;
      (iv) at least one electrode sandwiched between the piezoelectric ceramics; and
      (v) a bolt passing through the front mass, back mass, ceramics, and electrodes, wherein the bolt is operative to apply compressive force to the ceramics; and
   (b) a vibration-isolating housing adapted to be both compatible with a machining system and to receive the ultrasonic transducer therein, wherein the housing further includes a spring-like feature formed radially therein above the front mass, and wherein the spring-like feature further includes a curved and thinned section of the housing, and wherein the curved and thinned section of the housing is operative to permit flexion in the housing for isolating all vibrations generated by the ultrasonic transducer when the device is in operation except axial vibrations transmitted to the tool bit, thereby preventing unwanted vibration from traveling backward or upward into the machining system.

2. The device of claim 1, further comprising a tool holder, wherein the tool holder and the top portion of the housing are mechanically coupled to one another.

3. The device of claim 2, wherein the tool holder is compatible with either CAT or HSK machining systems.

4. The device of claim 1, wherein the ultrasonic transducer further includes a shrink-fit collet adapted to receive the tool bit.

5. The device of claim 1, wherein the mass of the back mass is substantially the same as the mass of the front mass.

6. The device of claim 1, wherein the ultrasonic transducer further includes a plurality of air inlets formed in the front mass; a plurality of cooling vanes formed circumferentially around the front mass beneath the air inlets; and wherein the plurality of cooling vanes is operative to force air through the air inlets and into the housing when the device is in operation.

7. The device of claim 6, wherein the housing further includes a plurality of air outlets formed therein, and wherein air forced into the housing by the cooling vanes passes over the ultrasonic transducer and exits the housing through the air outlets.

8. The device of claim 1, wherein the external surface of the housing further includes at least one electrical contact mounted thereof.

9. A device for use in a machining system, comprising:
   (a) an ultrasonic transducer, wherein the ultrasonic transducer is adapted to receive a tool bit, and wherein the ultrasonic transducer further comprises:
      (i) a front mass;
      (ii) a back mass;
      (iii) a plurality of piezoelectric ceramics positioned between the front mass and back mass;
      (iv) at least one electrode sandwiched between the piezoelectric ceramics; and
      (v) a bolt passing through the front mass, back mass, ceramics, and electrodes, wherein the bolt is operative to apply compressive force to the ceramics; and
   (b) a vibration-isolating housing adapted to be both compatible with a machining system and to receive the ultrasonic transducer therein, wherein the housing further includes a spring-like feature formed radially therein above the front mass, and wherein the spring-like feature further includes a curved and thinned section of the housing, and wherein the curved and thinned section of the housing is operative to permit flexion in the housing for isolating all vibrations generated by the ultrasonic transducer when the device is in operation except axial vibrations transmitted to the tool bit, thereby preventing unwanted vibration from traveling backward or upward into the machining system; and
   (c) a tool holder, wherein the tool holder and the top portion of the housing are mechanically coupled to one another.

10. The device of claim 9, wherein the tool holder is compatible with either CAT or HSK machining systems.

11. The device of claim 9, wherein the ultrasonic transducer further includes a shrink-fit collet adapted to receive the tool bit.

12. The device of claim 9, wherein the ultrasonic transducer further includes a plurality of air inlets formed in the front mass; a plurality of cooling vanes formed circumferentially around the front mass beneath the air inlets; and wherein the plurality of cooling vanes is operative to force air through the air inlets and into the housing when the device is in operation.

13. The device of claim 12, wherein the housing further includes a plurality of air outlets formed therein, and wherein air forced into the housing by the cooling vanes passes over the ultrasonic transducer and exits the housing through the air outlets.

14. The device of claim 9, wherein the housing further includes at least one electrical contact mounted on the external surface thereof.

* * * * *